(12) United States Patent
Ma (10) Patent No.: US 11,527,905 B2
(45) Date of Patent: Dec. 13, 2022

(54) WIRELESS CHARGING RECEIVER, CHARGING SYSTEM AND TERMINAL

(71) Applicant: Beijing Xiaomi Mobile Software Co., Ltd., Beijing (CN)

(72) Inventor: Qiang Ma, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 736 days.

(21) Appl. No.: 16/554,366

(22) Filed: Aug. 28, 2019

(65) Prior Publication Data

US 2020/0106290 A1 Apr. 2, 2020

(30) Foreign Application Priority Data

Sep. 28, 2018 (CN) .......................... 201811137409.2

(51) Int. Cl.
| | |
|---|---|
| *H02J 7/02* | (2016.01) |
| *H02J 50/10* | (2016.01) |
| *H02J 7/00* | (2006.01) |
| *H02J 7/34* | (2006.01) |

(52) U.S. Cl.
CPC ................ *H02J 7/025* (2013.01); *H02J 7/00* (2013.01); *H02J 50/10* (2016.02); *H02J 7/345* (2013.01); *H02J 2207/20* (2020.01)

(58) Field of Classification Search
None
See application file for complete search history.

(56) References Cited

U.S. PATENT DOCUMENTS

2018/0076635 A1* 3/2018 Maalouf .................. H02J 7/02

FOREIGN PATENT DOCUMENTS

| CN | 107947305 A | | 4/2018 |
|---|---|---|---|
| CN | 108233454 A | | 6/2018 |
| CN | 108233455 A | | 6/2018 |
| CN | 207518328 U | | 6/2018 |
| CN | 207518336 U | | 6/2018 |
| CN | 207766037 U | * | 8/2018 |
| CN | 207766037 U | | 8/2018 |
| CN | 108539832 A | | 9/2018 |

(Continued)

OTHER PUBLICATIONS

CN-207766037-U Machine translation. (Year: 2022).*

(Continued)

*Primary Examiner* — David V Henze-Gongola
(74) *Attorney, Agent, or Firm* — Finnegan, Henderson, Farabow, Garrett & Dunner, L.L.P.

(57) ABSTRACT

The present disclosure relates to a wireless charging receiver, a charging system, and a terminal. The wireless charging receiver includes: a receiving coil, configured to couple an alternating magnetic field of a transmitting coil of a wireless charging transmitter, to obtain an AC power supply; a receiving chip, having an input coupled to the receiving coil and an output coupled to an input of a switched-capacitor conversion chip, and configured to convert the AC power supply into a first DC power supply; and the switched-capacitor conversion chip, having an output coupled to a battery, and configured to output a second DC power supply based on the first DC power supply, and charge the battery based on the second DC power supply.

17 Claims, 6 Drawing Sheets

(56) References Cited

FOREIGN PATENT DOCUMENTS

WO  WO 2018/052728 A1  3/2018

OTHER PUBLICATIONS

International Search Report of PCT Application No. PCT/CN2018/115420 from the State Intellectual Property Office of the P.R. China, Beijing, China, dated May 29, 2019.
First Office Action for Chinese Application No. 201811137409.2, dated Jan. 17, 2020.
First Office Action for Indian Application No. 201947035096, dated Jun. 19, 2020.
Extended European Search Report in the European Application No. 19195677.0 dated Apr. 17, 2020.

* cited by examiner

WIRELESS CHARGING RECEIVER, CHARGING SYSTEM AND TERMINAL

CROSS-REFERENCE TO RELATED APPLICATION

This application is based on and claims priority to Chinese Patent Application No. 201811137409.2 filed on Sep. 28, 2018, the entire contents of which are hereby incorporated herein by reference.

TECHNICAL FIELD

The present disclosure relates to the field of terminal technologies, and more particularly to a wireless charging receiver, a charging system, and a terminal.

BACKGROUND

As a terminal is used widely, a wireless charging technology has become an important form for charging the terminal.

In the related art, a wireless charging receiver is provided in the terminal, and both the wireless charging receiver and a wireless charging transmitter are provided with coils. When a current in the wireless charging transmitter passes through a charging coil, an electromagnetic field may be generated. When a coil of the wireless charging receiver is close to the electromagnetic field, a current may be generated in the wireless charging receiver, thereby charging the terminal by using a transition between the current and the electromagnetic field. A battery in the terminal has a small input voltage, such as 4V. In order to improve charging power and efficiency, the wireless charging transmitter usually has a high output voltage, and a voltage conversion may be completed through buck converters (BUCK circuit) provided in the wireless charging receiver and the wireless charging transmitter.

SUMMARY

According to a first aspect of embodiments of the present disclosure, a wireless charging receiver is provided. The receiver includes: a receiving coil, a receiving chip, and a switched-capacitor conversion chip. The receiving coil is configured to couple an alternating magnetic field of a transmitting coil of a wireless charging transmitter, to obtain an alternating-current (AC) power supply. The receiving chip has an input coupled to the receiving coil and an output coupled to an input of the switched-capacitor conversion chip, and is configured to convert the AC power supply into a first direct-current (DC) power supply. The switched-capacitor conversion chip has an output coupled to a battery, and is configured to output a second DC power supply based on the first DC power supply, and charge the battery based on the second DC power supply. A voltage of the second DC power supply is lower than a voltage of the first DC power supply, and a current of the second DC power supply is greater than a current of the first DC power supply.

According to a second aspect of embodiments of the present disclosure, a terminal is provided. The terminal includes the wireless charging receiver according to any of the above first aspect.

According to a third aspect of embodiments of the present disclosure, a charging system is provided. The charging system includes: a wireless charging transmitter, a battery, and the wireless charging receiver according to any of the above first aspect.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Exemplary embodiments will be described in detail herein, examples of which are illustrated in the accompanying drawings. When the following description refers to the accompanying drawings, the same or similar elements may be denoted by the same number in different accompanying drawings, unless otherwise indicated. The embodiments described in the following exemplary embodiments do not represent all embodiments consistent with the present disclosure. Instead, they are merely examples of apparatus and methods consistent with some aspects of the present disclosure.

Figure 1:
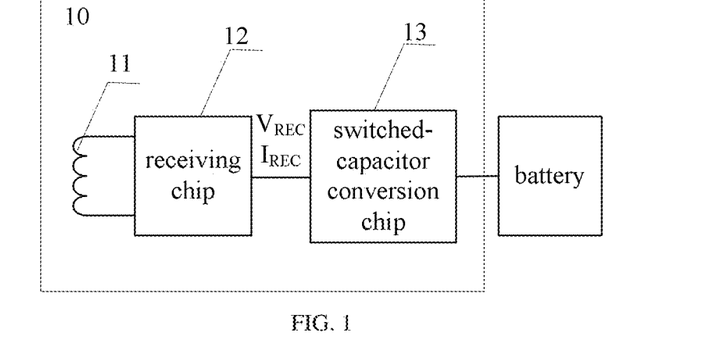
FIG. 1 illustrates a block diagram of a wireless charging receiver according to an exemplary embodiment of the present disclosure.

FIG. 1 is a block diagram illustrating a wireless charging receiver according to an exemplary embodiment of the present disclosure. As illustrated in FIG. 1, a wireless charging receiver 10 in the embodiment may include a receiving coil 11, a receiving chip 12, and a switched-capacitor conversion chip 13. The receiving coil 11 is configured to couple an alternating magnetic field of a transmitting coil of a wireless charging transmitter, to obtain an alternating-current (AC) power supply. The receiving chip 12 has an input coupled to the receiving coil 11 and an output coupled to an input of the switched-capacitor conversion chip 13. The receiving chip 12 is configured to convert the AC power supply into a first direct-current (DC) power supply. The switched-capacitor conversion chip 13 has an output coupled to a battery. The switched-capacitor conversion chip 13 is configured to output a second DC power supply based on the first DC power supply, and charge the battery based on the second DC power supply. A voltage of the second DC power supply is lower than a voltage of the first DC power supply, and a current of the second DC power supply is greater than a current of the first DC power supply.

In the embodiment, the receiving coil 11 may be coupled with the alternating magnetic field of the transmitting coil of the wireless charging transmitter, to obtain the AC power supply. The receiving chip 12 may convert the AC power supply into the first DC power supply. The switched-capacitor conversion chip 13 may output the second DC power supply based on the first DC power supply, and charge the battery based on the second DC power supply. The voltage of the second DC power supply is lower than the voltage of the first DC power supply, and the current of the second DC power supply is greater than the current of the first DC power supply.

The coupling may include a direct connection and an indirect connection.

The receiving coil 11 may be any type of coils that may be coupled with the alternating magnetic field to obtain the AC power supply.

The receiving chip 12 may be any chip that may perform rectification on the AC power supply to obtain the DC power supply.

The switched-capacitor conversion chip 13 may output the second DC power supply based on the first DC power supply, for example, the switched-capacitor conversion chip 13 reduces the voltage of the first DC power supply outputted by the receiving chip 12, and increases the current of the first DC power supply. At the time, it may be considered that the switched-capacitor conversion chip 13 is in an operating state. Usually, an external pin of the switched-capacitor conversion chip 13 is configured to enable the switched-capacitor conversion chip 13 in a shoot-through state or an open-circuit state. Further, the switched-capacitor conversion chip 13 may be controlled to be in the operating state by another chip such as a power management integrated circuit (PMIC), a processor, or a single-chip microcomputer. Detailed implementation of the other chip controlling the switched-capacitor conversion chip 13 to be in the operating state is not limited in the present disclosure. For example, the other chip may send an instruction for controlling the switched-capacitor conversion chip 13 to be in the operating state to the switched-capacitor conversion chip 13 through an I²C (inter-integrated circuit) protocol.

The switched-capacitor conversion chip 13 is a chip for reducing the voltage and increasing the current by a switch controlling a capacitor to charge/discharge. Alternatively, the switched-capacitor conversion chip 13 may be the 1/n switched-capacitor conversion chip, in which, n may be 1.5, 2, 3 and the like.

Figure 2A:
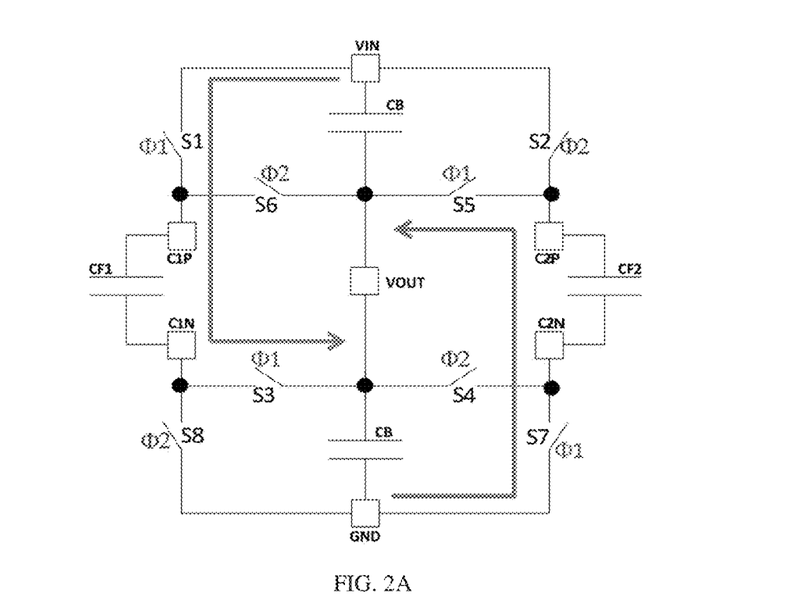
FIG. 2A and FIG. 2B illustrate schematic diagrams of conversion processes of a switched-capacitor conversion chip according to an exemplary embodiment of the present disclosure.
Figure 2B:
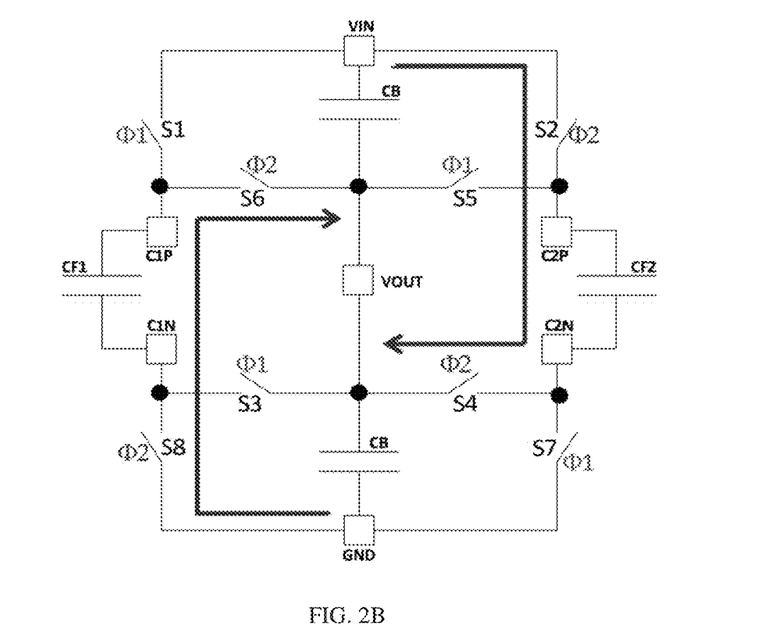

A conversion process of the switched-capacitor conversion chip 13 may be divided into a first stage Φ1 and a second stage Φ2. For the first stage Φ1, as illustrated in FIG. 2A, internal switches S1, S3, S5 and S7 are switched on, capacitor CF1 is charged, capacitor CF2 is discharged, and a current direction may be denoted by the arrows illustrated in FIG. 2A. For the second stage Φ2, as illustrated in FIG. 2B, internal switches S2, S4, S6 and S8 are switched on, capacitor CFI is discharged, capacitor CF2 is charged, and a current direction may be denoted by the arrows illustrated in FIG. 2B. By repeatedly switching on/off the internal switches in this way, it may be implemented to output $V_{OUT}=1/n\ V_{IN}$ and $I_{OUT}=n*I_{IN}$. It should be noted that, in the FIGS. 2A and 2B, all of C1P, C1N, GND, C2P, C2N, $V_{OUT}$ and $V_{IN}$ are pins, and CB refers to the capacitor.

In some embodiments, the switched-capacitor conversion chip 13 has a high conversion efficiency, which may reach to 98%. However, the BUCK circuit may have a low conversion efficiency, and the greater a difference between the input voltage and the output voltage in the BUCK circuit, the more severe the heat generation is, and the lower the conversion efficiency is. Therefore, comparing with reducing the voltage through the BUCK circuit, it may improve the charging efficiency by reducing the voltage and increasing the current through the switched-capacitor conversion chip. In order to charge with a high power, the output voltage of the wireless charging transmitter differs greatly from an input voltage of the battery, and the BUCK circuit is less efficient. Therefore, under a case charging with the high power, the effect of the switched-capacitor conversion chip to improve the charging efficiency is more obvious.

With the wireless charging receiver provided in the embodiment, the receiving coil is coupled with the alternating magnetic field of the transmitting coil of the wireless charging transmitter, to obtain the AC power supply; the receiving chip is configured to convert the AC power supply into the DC power supply; and the switched-capacitor conversion chip is configured to output the second DC power supply based on the first DC power supply, and charge the battery based on the second DC power supply, in which, the voltage of the second DC power supply is lower than the voltage of the first DC power supply, and the current of the second DC power supply is greater than the current of the first DC power supply, thus improving the charging power and the charging efficiency by employing the switched-capacitor conversion chip with high conversion efficiency. Further, the higher the output voltage of the wireless charging transmitter, the more obvious the charging efficiency is improved.

Figure 3:
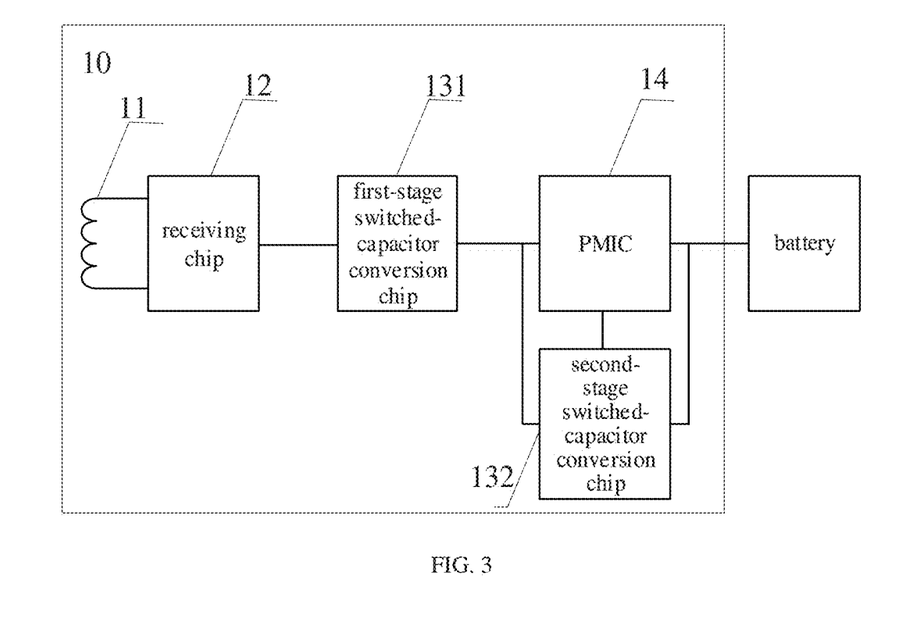
FIG. 3 illustrates a block diagram of a wireless charging receiver according to an exemplary embodiment of the present disclosure.

FIG. 3 is a block diagram illustrating a wireless charging receiver according to an exemplary embodiment of the present disclosure. As illustrated in FIG. 3, on the basis of the embodiment illustrated in FIG. 1, the switched-capacitor conversion chip 13 includes a first-stage switched-capacitor conversion chip 131 and a second-stage switched-capacitor conversion chip 132. The wireless charging receiver further includes a power management chip (PMIC) 14, such as the BUCK circuit. An input of the first-stage switched-capacitor conversion chip 131 is coupled to the receiving chip 12, an output of the first-stage switched-capacitor conversion chip 131 is coupled to an input of the second-stage switched-capacitor conversion chip 132 and an input of the PMIC 14, and an output of the second-stage switched-capacitor conversion chip 132 and an output of the PMIC 14 are coupled to the battery. The first-stage switched-capacitor conversion chip 131 is configured to output a third DC power supply based on the first DC power supply. A voltage of the third DC power supply is lower than a voltage of the first DC power supply, and a current of the third DC power supply is greater than a current of the first DC power supply (that is, the voltage of the first DC power supply inputted by the chip 12 is reduced, and the current of the first DC power supply is increased). The second-stage switched-capacitor conversion chip 132 is configured to output the second DC power supply based on the third DC power supply, and charge the battery with a first current based on the second DC power supply. A voltage of the second DC power supply is lower than a voltage of the third DC power supply, and a current of the second DC power supply is greater than a current of the third DC power supply (that is, after the voltage of the third DC power supply outputted by the switched-capacitor conversion chip 131 is reduced, and the current of the third DC power supply is increased, the battery is charged). The PMIC 14 is configured to charge the battery with a second current based on the second DC power supply, and the second current is lower than the first current. Here, charging the battery with the first current should be understood to be a constant-current charging, and charging the battery with the second current should be understood to be a constant-voltage charging.

In the embodiment, when charging with the high power, the PMIC 14 does not operate, the second-stage switched-capacitor conversion chip 132 operates, and charging with the high power is implemented through the second-stage switched-capacitor conversion chip 132. When charging with the low power, the PMIC 14 operates, the second-stage switched-capacitor conversion chip 132 does not operate, and charging with the low power is implemented through the PMIC 14. Alternatively, the PMIC 14 and the second-stage switched-capacitor conversion chip 132 are controlled to operate or not through a processor of a terminal. For example, a constant-current charging period may be implemented through the first-stage switched-capacitor conversion chip and the second-stage switched-capacitor conversion chip, and a constant-voltage charging period may be implemented through the first-stage switched-capacitor conversion chip and the PMIC. Here, the PMIC may be as a charging chip. It should be noted that, when charging with the low power, such as 5 W, the switched-capacitor conversion chip may be in the shoot-through state. For example, the first-stage switched-capacitor conversion chip is in the shoot-through state, and the second-stage switched-capacitor conversion chip is in the open-circuit state.

Figure 4:
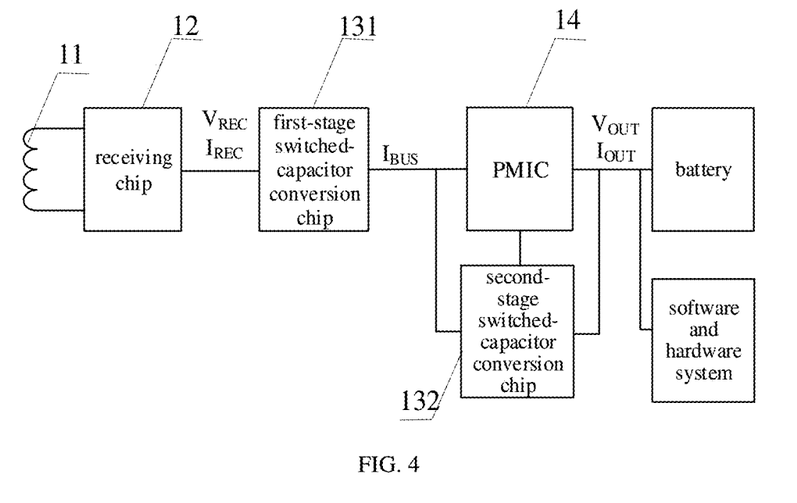
FIG. 4 illustrates a block diagram of a wireless charging receiver according to an exemplary embodiment of the present disclosure.
Figure 5A:
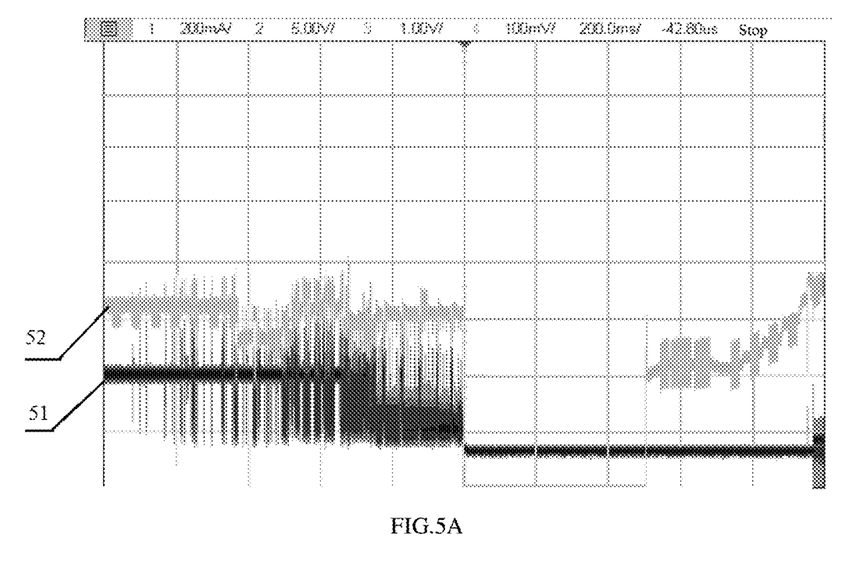
FIG. 5A and FIG. 5B illustrate waveform diagrams of a wireless charging receiver according to an exemplary embodiment of the present disclosure.

In some embodiments, illustrated in FIG. 4, in addition to charging the battery, the wireless charging receiver also provides power supply for a software and hardware system of the terminal. When the terminal charges the battery through the wireless charging receiver, a load dl of the software and hardware system of the terminal usually fluctuates, which may cause that $I_{OUT}$ changes by $\Delta I$, thereby causing $I_{REC}$ to change (for example, when the switched-capacitor conversion chip includes two stages and each stage is ½ switched-capacitor conversion chip, the change of $I_{REC}$ is ¼ $\Delta I$). When $I_{REC}$ changes greatly, communication of the wireless charging system may be affected. For example, the communication of the wireless charging system may be disconnected. For example, as illustrated in FIG. 5A, 51 represents a waveform of $I_{OUT}$, and 52 represents a waveform of $V_{REC}$ caused by fluctuation of the $I_{OUT}$.

Figure 5B:
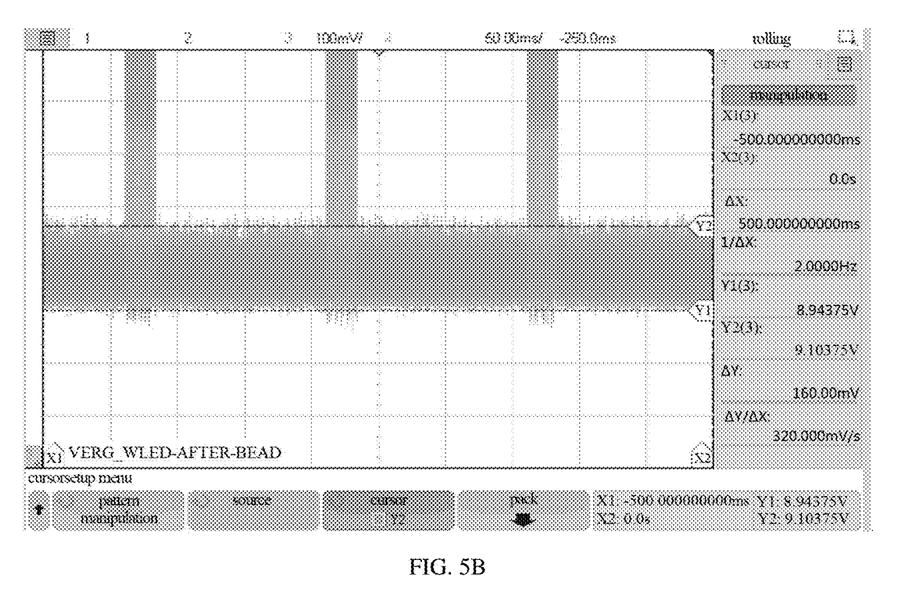

In addition, as illustrated in FIG. 5B, when wireless charging is performed, a transmitting chip in a wireless charging transmitter needs to communicate with the receiving chip in the wireless charging receiver in real time, and a large amplitude ripple may be superimposed on $V_{REC}$, causing that the current lour fluctuates frequently with the communication, which is easy to cause an overcharging problem. For example, it is assumed that $V_{REC}$ reaches to nearly 400 mV, the ripple representing on the output $V_{OUT}$ is 100 mV after passing through two ½ switched-capacitor conversion chips. When an internal resistance of the battery is 100 m, momentary fluctuation of $I_{OUT}$ is 1 A.

It may be seen that, both the fluctuation of the load of the soft and hardware system and the fluctuation of $V_{REC}$ may represent change of a path current Therefore, in order to improve stability of a charging process, in some embodiments, the switched-capacitor conversion chip 13 is further configured to detect the path current, and enter into a current limiting mode in response to the path current being greater than or equal to a sum of a current threshold and a first current deviation. The first current deviation is greater than or equal to 0, and lower than the current threshold. Here, the current limiting mode is to limit a current of the switched-capacitor conversion chip. For example, it may perform at least one of: limiting the input current of the switched-capacitor conversion chip, limiting the output current of the switched-capacitor conversion chi, and limiting a current of the internal switch. When the switched-capacitor conversion chip enters into the current limiting mode, the path current may be decreased, thereby avoiding a sudden change in the path current.

In the embodiment, when the path current is greater than or equals to the sum of the current threshold and the first current deviation, it may represent that the path current is abnormal, which may affect the communication of the wireless charging system or cause overcharging. When the path current is lower than a difference between the current threshold and a second current deviation, it may represent that the path current is normal, which may not affect the communication of the wireless charging system and not cause the overcharging.

In some embodiments, the path current includes any of: the input current of the switched-capacitor conversion chip 13, the output current of the switched-capacitor conversion chip 13, and a current on the internal switch in the switched-capacitor conversion chip 13.

In some embodiments, when the switched-capacitor conversion chip includes the first-stage switched-capacitor conversion chip and the second-stage switched-capacitor conversion chip, any of the first-stage switched-capacitor conversion chip and the second-stage switched-capacitor conversion chip may be configured to detect the path current, and enter into the current limiting mode when the path current is greater than or equals to the sum of the current threshold and the first current deviation.

In some embodiments, when the first-stage switched-capacitor conversion chip is configured to detect the path current, the path current may include any of: the input current ($I_{REC}$) of the first-stage switched-capacitor conversion chip 131, the output current ($I_{BUS}$) of the first-stage switched-capacitor conversion chip 131, the main circuit $I_{OUT}$ outputted by the second-stage switched-capacitor conversion chip 132 and the PMIC connecting in parallel, and the current on the internal switch in the first-stage switched-capacitor conversion chip 131. When the second-stage switched-capacitor conversion chip is configured to detect the path current, the path current may include any of: the input current of the first-stage switched-capacitor conversion chip 131, the output current of the first-stage switched-capacitor conversion chip 131, the main circuit $I_{OUT}$ outputted by the second-stage switched-capacitor conversion chip 132 and the PMIC connecting in parallel, and the current on the internal switch in the second-stage switched-capacitor conversion chip 132.

In some embodiments, the switched-capacitor conversion chip 131 is further configured to exit the current limiting mode in response to the path current being lower than a difference between the current threshold and the second current deviation. The second current deviation is greater than or equal to 0, and lower than the current threshold. It should be noted that, exiting the current limiting mode here corresponds to the above-described entering into the current limiting mode.

In some embodiments, the first current deviation may be equal to the second current deviation. By the first current deviation and the second current deviation, and both the first current deviation and the second current deviation being greater than 0, repeatedly switching between entering into the current limiting mode and exiting the current limiting mode at the current threshold may be avoided.

In some embodiments, the switched-capacitor conversion chip 13 may enter into the current limiting mode by increasing the on-resistance of the internal switch of the switched-capacitor conversion chip. In some embodiments, in order to improve the charging efficiency, during the switched-capacitor conversion chip operates, the on-resistance of the internal switch is usually a minimum value. When the path current is greater than or equals to the sum of the current threshold and the first current deviation, the switched-capacitor conversion chip increases the on-resistances of respective internal switches immediately, to enter into the current limiting mode, thereby decreasing the path current. Further, when the path current is lower than the difference between the current threshold and the second current deviation, the switched-capacitor conversion chip decreases the on-resistances of respective internal switches to the minimum value immediately, to exit the current limiting mode, thereby increasing the path current. For example, the current threshold of $I_{REC}$ may be set to 1.1 A, and when the load (or $V_{REC}$) of the software and hardware system fluctuates, causing that $V_{REC}$ is greater than or equals to 1.1 A, the switched-capacitor conversion chip immediately feeds back within several switching cycles, to enter into the current limiting mode and decrease the on-resistances of respective internal switches. Response time of the switched-capacitor conversion chip may be within a few tens of microseconds. When the fluctuation of the load ($V_{REC}$) of the software and hardware system disappears, the switched-capacitor conversion chip exits the current limiting mode, of which the on-resistance of the internal switch is restored to the minimum value.

In some embodiments, the internal switch may be a Metal-Oxide-Semiconductor Field-Effect Transistor (MOSFET).

It should be noted that, an adjustment amplitude of the on-resistance of the internal switch of the switched-capacitor conversion chip is not limited by the present disclosure. In some embodiments, the adjustment amplitude may be a fixed amplitude, or may also be determined according to a difference degree between the path current and the current threshold.

In some embodiments, the switched-capacitor conversion chip 13 may enter into the current limiting mode by disconnecting the internal switch charging a charging capacitor in the switched-capacitor conversion chip, or connecting the charging capacitor to the output of the switched-capacitor conversion chip in parallel. Here, the charging capacitor may be CF1 and CF2 in the FIG. 2A and FIG. 2B. When the conversion process of the switched-capacitor conversion chip 13 is in the first stage c 1, disconnecting the internal switch charging the charging capacitor in the switched-capacitor conversion chip may be switching off S1 and S3, and connecting the charging capacitor to the output of the switched-capacitor conversion chip in parallel may be switching off S1 and S3, and switching on S6 and S8. When the conversion process of the switched-capacitor conversion chip 13 is in the second stage Φ2, disconnecting the internal switch charging the charging capacitor in the switched-capacitor conversion chip may be switching off S2 and S4, and connecting the charging capacitor to the output of the switched-capacitor conversion chip in parallel may be switching off S2 and S4, and switching on S5 and S7. For example, when the path current is greater than or equals to the sum of the current threshold and the first current deviation, the switched-capacitor conversion chip immediately disconnects the internal switch charging the charging capacitor in the switched-capacitor conversion chip, or connects the charging capacitor to the output of the switched-capacitor conversion chip in parallel for discharging, to enter into the current limiting mode, thereby decreasing the path current. Further, when the path current is lower than the difference between the current threshold and the second current deviation, the switched-capacitor conversion chip recovers to a normal switch process for charging and discharging the capacitor (for example, the first stage Φ1 and the second stage Φ2 in the FIGS. 2A and 2B respectively correspond repeated switch processes of the internal switch), to exit the current limiting mode, thereby increasing the path current.

Figure 6:
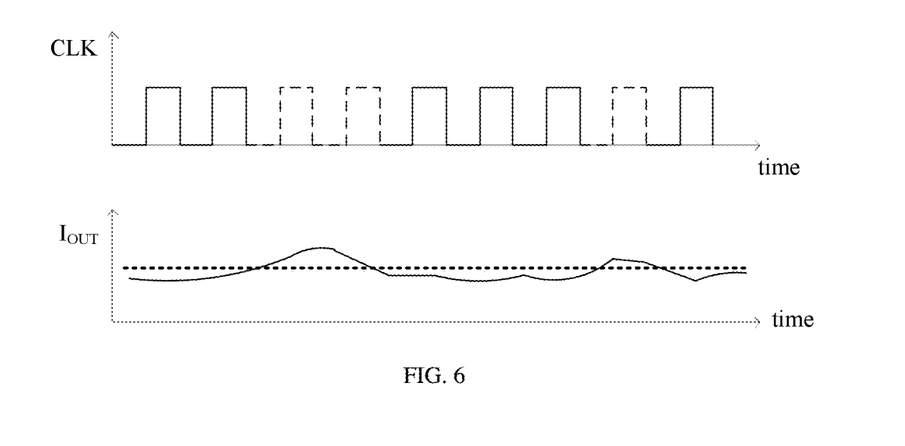
FIG. 6 and FIG. 7 illustrate current diagrams of a wireless charging receiver according to an exemplary embodiment of the present disclosure.

In some embodiments, the internal switch of the switched-capacitor conversion chip is switched on or off through a clock according to a certain frequency, and certain logic timing. Therefore, by performing cycle control on the switched-capacitor conversion chip, it may implement to disconnect the internal switch charging the charging capacitor in the switched-capacitor conversion chip; or, to connect the charging capacitor to the output of the switched-capacitor conversion chip in parallel for charging. For example, as illustrated in FIG. 6, when $I_{OUT}$ exceeds the current threshold illustrated by the dashed line, the internal switch charging the charging capacitor in the switched-capacitor conversion chip is disconnected in the corresponding time control period (that is, the period illustrated by the dashed line); or the charging capacitor is connected to the output of the switched-capacitor conversion chip in parallel for discharging. Further, when $I_{OUT}$ does not exceed the current threshold illustrated by the dashed line, the switched-capacitor conversion chip restores the abnormal switch process of charging/discharging of the capacitor in the corresponding clock control cycle. It should be noted that, FIG. 6 is taking that both the first current deviation and the second current deviation are 0 as an example.

In some embodiments, the switched-capacitor conversion chip 13 may enter into the current limiting mode by decreasing a charging duration of the charging capacitor in the switched-capacitor conversion chip. Here, the charging capacitor may be CF1 and CF2 in the FIG. 2A and FIG. 2B, and decreasing the charging duration of the charging capacitor in the switched-capacitor conversion chip may be decreasing the charging duration of CF1 and CF2. For example, when the path current is greater than or equals to the sum of the current threshold and the first current deviation, the switched-capacitor conversion chip immediately decreases the charging duration of the charging capacitor in the switched-capacitor conversion chip, to enter into the current limiting mode, thereby decreasing the path current. Further, when the path current is lower than the difference between the current threshold and the second current deviation, the switched-capacitor conversion chip restores the normal charging duration of the charging capacitor, to exit the current limiting mode, thereby increasing the path current.

Figure 7:
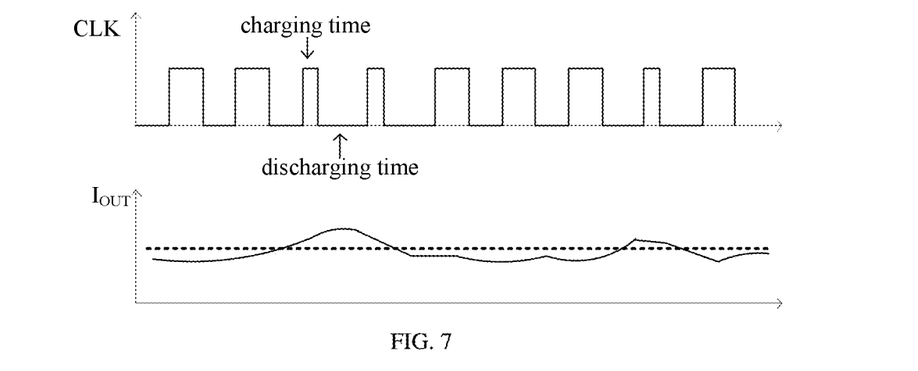

In some embodiments, the internal switch of the switched-capacitor conversion chip is switched on or off through the clock according to a certain frequency, and a certain logic timing. Therefore, by decreasing a duty cycle of the clock, it may implement decreasing the charging duration of the charging capacitor in the switched-capacitor conversion chip. For example, as illustrated in FIG. 7, when $I_{OUT}$ exceeds the current threshold illustrated by the dashed line, a clock duty cycle corresponding to the clock control cycle is decreased, that is, the charging duration is decreased, and the discharging duration is increased. Further, when Iour does not exceed the current threshold illustrated by the dashed line, the clock duty cycle corresponding to the clock control cycle is restored. It should be noted that, FIG. 7 is taking that both the first current deviation and the second current deviation are 0 as an example.

In some embodiments, the switched-capacitor conversion chip 13 is further configured to adjust the current threshold according to a first control instruction from the processor of the terminal. For example, the expected path current may vary with the charging period. For implementing a more accurate control, the current threshold may be adjusted based on the expected path current. When the expected path current is lager, the current threshold may be lager, and when the expected path current is smaller, the current threshold may be smaller.

In some embodiments, the switched-capacitor conversion chip 13 may further be configured to enter into a shoot-through state according to a second control instruction from the processor of the terminal. For example, when the switched-capacitor conversion chip 13 is in the constant-voltage charging state, the current does not need to be increased. Therefore, the switched-capacitor conversion chip 13 may be controlled to be in the shoot-through state. For the ½ switched-capacitor conversion chip illustrated in FIG. 2A and FIG. 2B, the switched-capacitor conversion chip being the shoot-through state may be that S1, S2, S5 and S6 are switched on, and S3, S4, S7 and S8 are switched off. When the switched-capacitor conversion chip is in the shoot-through state, $V_{OUT}$ may equal to $V_{IN}$, and $I_{OUT}$ may equal to $I_{IN}$. It should be noted that, when the switched-capacitor conversion chip 13 includes the first-stage switched-capacitor conversion chip 131 and the second-stage switched-capacitor conversion chip 132, the first-stage switched-capacitor conversion chip 131 may be controlled to be in the shoot-through state.

In addition, it is described above that the switched-capacitor conversion chip may detect the output current of the charging path, and enter into the current limiting mode based on the output current of the charging path, which may implement a higher response speed.

With the wireless charging receiver provided in the embodiment, the first-stage switched-capacitor conversion chip is configured to output the third DC power supply based on the first DC power supply. The voltage of the third DC power supply is lower than the voltage of the first DC power supply, and the current of the third DC power supply is greater than the current of the first DC power supply. The second-stage switched-capacitor conversion chip is configured to output the second DC power supply based on the third DC power supply, and charge the battery with the first current based on the second DC power supply. The voltage of the second DC power supply is lower than the voltage of the third DC power supply, and the current of the second DC power supply is greater than the current of the third DC power supply. The PMIC is configured to charge the battery with the second current based on the second DC power supply, and the second current is lower than the first current. In this way, charging with the low power may be implemented on the basis of improving the charging efficiency charging with the lager power.

Figure 8:
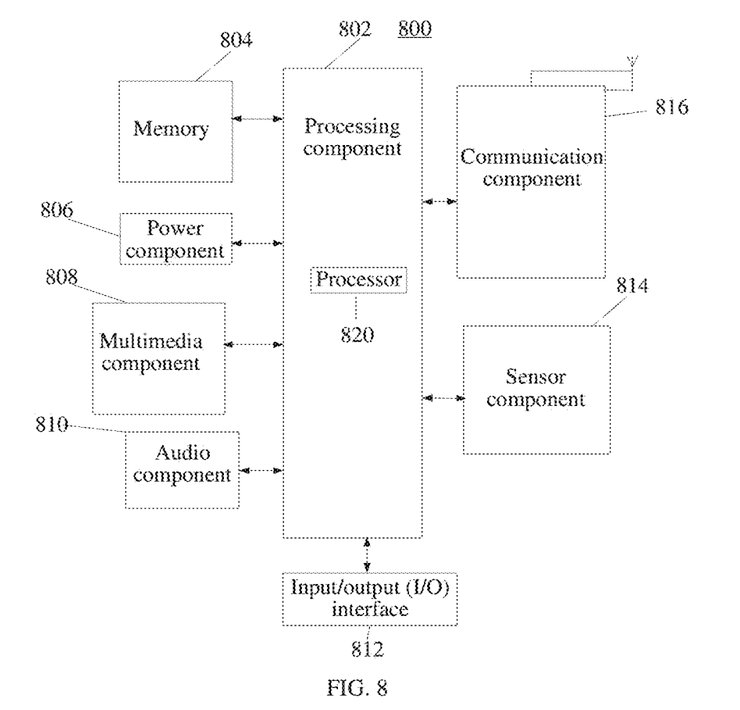
FIG. 8 illustrates a block diagram of a terminal according to an exemplary embodiment of the present disclosure.

FIG. 8 is a block diagram illustrating a terminal 800 according to an exemplary embodiment of the present disclosure. For example, the terminal 800 may be a mobile phone, a computer, a digital broadcasting terminal, message sending and receiving equipment, a game controller, a tablet device, a medical device, fitness equipment, a personal digital assistant or the like.

As illustrated in FIG. 8, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the operations in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contacting data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contacting with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as Wi-Fi, 4G, or 5G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 804 including instructions. For example, the non-transitory computer-readable storage medium may be a ROM, a RAM, a CD-ROM, a magnetic tape, a floppy disc, an optical data storage device, and the like.

The terminal 800 may include a wireless charging receiver, e.g., as a part of the power component 806. The wireless charging receiver includes a receiving coil, a receiving chip, and a switched-capacitor conversion chip. The receiving coil is configured to couple an alternating magnetic field of a transmitting coil of a wireless charging transmitter, to obtain an AC power supply. The receiving chip has an input coupled to the receiving coil and an output coupled to an input of the switched-capacitor conversion chip, and is configured to convert the AC power supply into a first DC power supply. The switched-capacitor conversion chip has an output coupled to a battery, and is configured to output a second DC power supply based on the first DC power supply, and charge the battery based on the second DC power supply. A voltage of the second DC power supply is lower than a voltage of the first DC power supply, and a current of the second DC power supply is greater than a current of the first DC power supply.

In an embodiment, the switched-capacitor conversion chip includes a first-stage switched-capacitor conversion chip and a second-stage switched-capacitor conversion chip. The wireless charging receiver further includes PMIC. An input of the first-stage switched-capacitor conversion chip is coupled to the receiving chip, an output of the first-stage switched-capacitor conversion chip is coupled to an input of the second-stage switched-capacitor conversion chip and an input of the power management chip, and an output of the second-stage switched-capacitor conversion chip and an output of the power management chip are coupled to the battery. The first-stage switched-capacitor conversion chip is configured to output a third DC power supply based on the first DC power supply. A voltage of the third DC power supply is lower than a voltage of the first DC power supply, and a current of the third DC power supply is greater than a current of the first DC power supply. The second-stage switched-capacitor conversion chip is configured to output the second DC power supply based on the third DC power supply, and charge the battery with a first current based on the second DC power supply. A voltage of the second DC power supply is lower than a voltage of the third DC power supply, and a current of the second DC power supply is greater than a current of the third DC power supply. The power management chip is configured to charge the battery with a second current based on the second DC power supply, and the second current is lower than the first current.

In an embodiment, the switched-capacitor conversion chip is further configured to detect a path current, and enter into a current limiting mode in response to the path current being greater than or equal to a sum of a current threshold and a first current deviation. The first current deviation is greater than or equal to 0, and lower than the current threshold.

In an embodiment, the switched-capacitor conversion chip is configured to enter into the current limiting mode by at least one of: increasing an on-resistance of an internal switch of the switched-capacitor conversion chip; disconnecting an internal switch for charging a charging capacitor in the switched-capacitor conversion chip; connecting the charging capacitor to an output of the switched-capacitor conversion chip in parallel for discharging; and reducing a charging duration of the charging capacitor in the switched-capacitor conversion chip.

In an embodiment, the switched-capacitor conversion chip is further configured to exit the current limiting mode in response to the path current being lower than a difference between the current threshold and a second current deviation. The second current deviation is greater than or equal to 0, and lower than the current threshold.

In an embodiment, the path current includes any of: an input current of the switched-capacitor conversion chip, an output current of the switched-capacitor conversion chip, and a current on an internal switch in the switched-capacitor conversion chip.

In an embodiment, the switched-capacitor conversion chip is further configured to adjust the current threshold according to a first control instruction from a processor of a terminal.

In an embodiment, in order to improve charging efficiency, and optimize a power transmission state, the processor may detect the path current (such as $I_{REC}$ $I_{BUS}$ or $I_{OUT}$) in real time and the voltage ($V_{REC}$, $V_{BUS}$ or $V_{OUT}$), and control respective modules (such as, the switched-capacitor conversion module) in the wireless charging transmitter and the wireless charging receiver, such that the present power is the largest, the efficiency is the highest, and the charging is more stable.

For example, when the battery is in a constant-current charging period, a voltage of the battery increases gradually. In this way, a current entering the battery will be reduced gradually. When the processor detects that the path current is reduced, the processor may control a charger to increase the output voltage, such that the charging current remains a maximum state. When the battery enters the constant-voltage charging period, the current of the battery is decreased gradually. At the same time, the processor may control the charger to reduce the output voltage, or control the switched-capacitor conversion chip to operate in the shoot-through state. In this way, an entire charging efficiency is improved.

In an embodiment, the processor is further configured to output the first control instruction for adjusting the current threshold according to the path current expected presently. The switched-capacitor conversion chip is further configured to adjust the current threshold according to the first control instruction.

Figure 9:
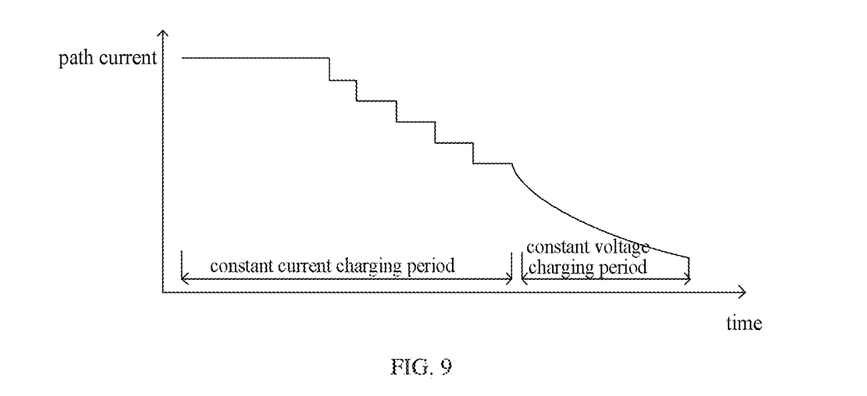
FIG. 9 illustrates a current diagram for charging a battery according to an exemplary embodiment of the present disclosure.

For example, as illustrated in FIG. 9, charging the battery is usually divided into the constant-voltage charging period and the constant-current charging period, and path currents are different in different time periods. In order to implement a more accurate control, the processor may adjust the current threshold according to the path current expected presently.

In an embodiment, the processor is further configured to output a second control instruction for controlling the switched-capacitor conversion chip to enter into a shoot-through state in response to entering a constant-voltage charging period. The switched-capacitor conversion chip is further configured to enter into the shoot-through state according to the second control instruction. For example, the processor may send a triggering signal for triggering the switched-capacitor conversion chip to enter the shoot-through state to the switched-capacitor conversion chip, and the switched-capacitor conversion chip may be enter into the shoot-through state according to the triggering signal.

In an embodiment, when the switched-capacitor conversion chip enters into the current limiting mode by increasing the on-resistance of the internal switch of the switched-capacitor conversion chip, the processor is further configured to reduce the output voltage of the receiving chip according to the on-resistance of the internal switch of the switched-capacitor conversion chip. For example, the processor may determine whether the on-resistance of the internal switch of the switched-capacitor conversion chip is too large according to the output voltage of the receiving chip and the on-resistance of the internal switch of the switched-capacitor conversion chip. When the on-resistance of the internal switch of the switched-capacitor conversion chip is too large, the output voltage of the receiving chip may be reduced. For example, the output voltage of the receiving chip is reduced by 20 mv. Further, since the output voltage $V_{REC}$ of the receiving chip is reduced, $I_{REC}$ is also reduced. For implementing the same charging power, the switched-capacitor conversion chip may reduce the on-resistance of its internal switch.

In an embodiment, when the switched-capacitor conversion chip enters into the current limiting mode by disconnecting the internal switch charging the charging capacitor in the switched-capacitor conversion chip, or connecting the charging capacitor to the output of the switched-capacitor conversion chip in parallel for discharging, the processor is further configured to reduce the output voltage of the receiving chip of the wireless charging receiver according to a conductive state of the internal switch of the switched-capacitor conversion chip. For example, the processor may determine whether the switched-capacitor conversion chip should exit the current limiting mode according to the output voltage of the receiving chip and the conductive state of the internal switch of the switched-capacitor conversion chip. When the switched-capacitor conversion chip should exit the current limiting mode, the output voltage of the receiving chip may be reduced. For example, the output voltage of the receiving chip reduces by 20 mv. Further, since the output voltage $V_{REC}$ of the receiving chip is reduced, $I_{REC}$ is also reduced. For implementing the same charging power, the switched-capacitor conversion chip may exit the current limiting mode.

In an embodiment, when the switched-capacitor conversion chip enters into the current limiting mode by decreasing the charging duration of the charging capacitor in the switched-capacitor conversion chip, the processor is further configured to reduce the output voltage of the receiving chip of the wireless charging receiver according to the charging duration of the charging capacitor of the switched-capacitor conversion chip. For example, the processor may determine whether the switched-capacitor conversion chip should exit the current limiting mode according to the output voltage of the receiving chip and the charging duration of the charging capacitor in the switched-capacitor conversion chip. When the switched-capacitor conversion chip should exit the current limiting mode, the output voltage of the receiving chip may be reduced. For example, the output voltage of the receiving chip reduces by 20 mv. Further, since the output voltage $V_{REC}$ of the receiving chip is reduced, $I_{REC}$ is also reduced. For implementing the same charging power, the switched-capacitor conversion chip may exit the current limiting mode.

The present disclosure further provides a charging system. The charging system includes a wireless charging transmitter, a battery and a wireless charging receiver. The wireless charging receiver includes a receiving coil, a receiving chip, and a switched-capacitor conversion chip. The receiving coil is configured to couple an alternating magnetic field of a transmitting coil of the wireless charging transmitter, to obtain an AC power supply. The receiving chip has an input coupled to the receiving coil and an output coupled to an input of the switched-capacitor conversion chip, and is configured to convert the AC power supply into a first DC power supply. The switched-capacitor conversion chip has an output coupled to a battery, and is configured to output a second DC power supply based on the first DC power supply, and charge the battery based on the second DC power supply. A voltage of the second DC power supply is lower than a voltage of the first DC power supply, and a current of the second DC power supply is greater than a current of the first DC power supply.

In an embodiment, the switched-capacitor conversion chip includes a first-stage switched-capacitor conversion chip and a second-stage switched-capacitor conversion chip. The wireless charging receiver further includes a PMIC. An input of the first-stage switched-capacitor conversion chip is coupled to the receiving chip, an output of the first-stage switched-capacitor conversion chip is coupled to an input of the second-stage switched-capacitor conversion chip and an input of the power management chip, and an output of the second-stage switched-capacitor conversion chip and an output of the power management chip are coupled to the battery. The first-stage switched-capacitor conversion chip is configured to output a third DC power supply based on the first DC power supply. A voltage of the third DC supply being lower than a voltage of the first DC power supply, and a current of the third DC power supply is greater than a current of the first DC power supply. The second-stage switched-capacitor conversion chip is configured to output the second DC power supply based on the third DC power supply, and charge the battery with a first current based on the second DC power supply. A voltage of the second DC power supply is lower than a voltage of the third DC power supply, and a current of the second DC power supply is greater than a current of the third DC power supply. The power management chip is configured to charge the battery with a second current based on the second DC power supply, the second current being lower than the first current.

In an embodiment, the switched-capacitor conversion chip is further configured to detect a path current, and enter into a current limiting mode in response to the path current being greater than or equal to a sum of a current threshold and a first current deviation. The first current deviation is greater than or equal to 0, and lower than the current threshold.

In an embodiment, the switched-capacitor conversion chip is configured to enter into the current limiting mode by at least one of: increasing an on-resistance of an internal switch of the switched-capacitor conversion chip; disconnecting an internal switch for charging a charging capacitor in the switched-capacitor conversion chip; connecting the charging capacitor to an output of the switched-capacitor conversion chip in parallel for discharging; and reducing a charging duration of the charging capacitor in the switched-capacitor conversion chip.

In an embodiment, the switched-capacitor conversion chip is further configured to exit into the current limiting mode in response to the path current being lower than a difference between the current threshold and a second current deviation. The second current deviation is greater than or equal to 0, and lower than the current threshold.

In an embodiment, the path current includes any of: an input current of the switched-capacitor conversion chip, an output current of the switched-capacitor conversion chip, and a current on an internal switch in the switched-capacitor conversion chip.

In an embodiment, the switched-capacitor conversion chip is further configured to detect the path current, and enter into the current limiting mode in response to the path current being greater than or equal to a sum of a current threshold and a first current deviation, and the first current deviation is greater than or equals to 0, and lower than the current threshold.

In an embodiment, the charging system further includes a processor. The processor is configured to output a first control instruction for adjusting the current threshold according to a path current expected presently. The switched-capacitor conversion chip is further configured to adjust the current threshold according to the first control instruction of a terminal of the processor.

In an embodiment, the processor is further configured to reduce an output voltage of the receiving chip of the wireless charging receiver according to an on-resistance of an internal switch of the switched-capacitor conversion chip, a conductive state of the internal switch of the switched-capacitor conversion chip or a charging duration of a charging capacitor in the switched-capacitor conversion chip.

In an embodiment, the processor is further configured to output a second control instruction for controlling the switched-capacitor conversion chip to enter into a shoot-through state in response to entering a constant-voltage charging period; and the switched-capacitor conversion chip is further configured to enter into the shoot-through state according to the second control instruction of the processor of the terminal.

Figure 10:
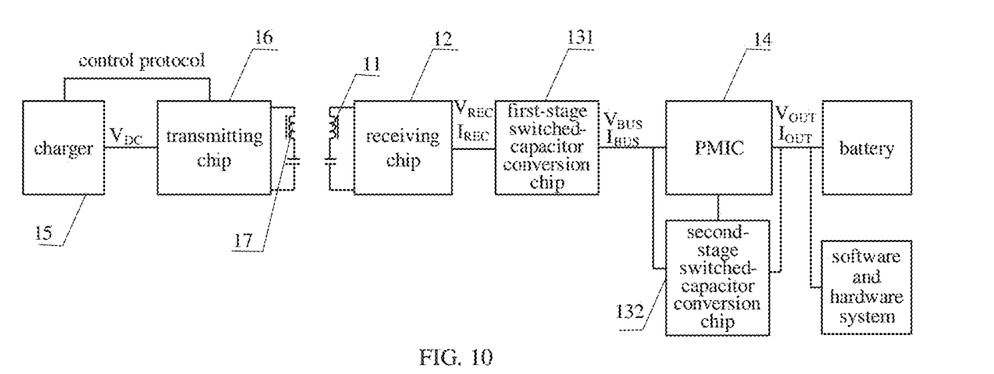
FIG. 10 illustrates a schematic diagram of a charging system according to an exemplary embodiment of the present disclosure.

The charging system may include the wireless charging receiver illustrated in FIG. 4, and a wireless charging transmitter, which includes a charger 15, a transmitting chip 16, and a transmitting coil 17. The input of the transmitting chip 16 is coupled to the charger 15. The output of the transmitting chip 16 is coupled to the transmitting coil 17. The transmitting chip 16 is configured to communicate with the charger 15 based on the control protocol, control the charger 15 to output a voltage of DC power supply, and convert the DC power supply into an AC power supply. The transmitting coil 17 is configured to convert the AC power supply into an alternating magnetic field. Here, the charger 15 is directly coupled to the transmitting chip 16. In this way, the BUCK circuit is omitted in the wireless charging transmitter, and power consumption brought by the BUCK circuit may be avoided, thereby further improving the charging efficiency.

In some embodiments, the control protocol may be power delivery (PD), quick charge (QC) 4.0, super charge protocol (SCP). The transmitting chip 16 directly communicates with the charger 15 through a protocol such as PD, QC4.0, SCP and the like. An accuracy of the output voltage may reach to 20 mV. When the output voltage is upon 3V-20V, the power needed by the behind may be adjusted accurately. In addition, since the output voltage of the transmitting chip is greater than the voltage on the BUCK circuit, the current in the coil may be reduced, thereby reducing the coil heating.

It should be noted that, in the FIG. 10, both the capacitor connecting with the transmitting coil in series and the capacitor connecting with the receiving coil in series may be resonant capacitors, which may be configured to improve the charging power.

Taking that the charging power is 20 W and the switched-capacitor conversion chip is combined by two ½ switched-capacitor conversion chips as an example, the operating process may be as follows.

(1) The transmitting chip directly communicates with the charger through the protocol such as PD, QC4.0 or SCP, and adjusts the output voltage VDC of the charger to be about 20V.

(2) The transmitting chip converts the DC voltage outputted by the charger into the AC voltage, to supply for the transmitting coil.

(3) The receiver coil outputs the AC voltage to the receiver chip by coupling the energy of the transmitting coil, and the current of the receive coil is about 1 A.

(4) The receiving chip rectifies the AC voltage and outputs the DC voltage $V_{REC}$, which is about 19V, and the path current $I_REC$ is about 1.1 A, that is, the output power is about 20 W.

(5) $V_{REC}$ is stepped down by half via the first-stage ½ switched-capacitor conversion chip, and the outputted $V_Bus$ is about 9V. The path current $I_{BUS}$ is about 2.2 A.

(6) $V_{BUS}$ is stepped down by half via the second-stage ½ switched-capacitor conversion chip, and the outputted $V_{OUT}$ is about 4V. The path current $I_{OUT}$ is about 4.4 A.

(7) $V_{BUS}$ may be used as an auxiliary charge via PMIC, to implement functions such as input and output current limiting, turbulence and low power charging.

Other embodiments of the present disclosure will be apparent to those skilled in the art from consideration of the specification and practice of the present disclosure disclosed here. This application is intended to cover any variations, uses, or adaptations of the present disclosure following the general principles of the present disclosure and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exaction construction that has been described above and illustrated in the accompanying drawings, and that various modifications and changes can be made without departing from the scope thereof. It is intended that the scope of the present disclosure only be limited by the appended claims.

What is claimed is:

1. A wireless charging receiver, comprising:
    a receiving coil, configured to couple an alternating magnetic field of a transmitting coil of a wireless charging transmitter, to obtain an alternating-current (AC) power supply;
    a receiving chip, having an input coupled to the receiving coil and an output coupled to an input of a switched-capacitor conversion chip, and configured to convert the AC power supply into a first direct-current (DC) power supply; and
    the switched-capacitor conversion chip, having an output coupled to a battery, and configured to output a second DC power supply based on the first DC power supply, and charge the battery based on the second DC power supply, a voltage of the second DC power supply being lower than a voltage of the first DC power supply, and a current of the second DC power supply being greater than a current of the first DC power supply,
    wherein the switched-capacitor conversion chip is configured to detect a path current, and enter into a current limiting mode in response to the path current being greater than or equal to a sum of a current threshold and a first current deviation, the first current deviation being greater than or equal to 0, and lower than the current threshold.

2. The receiver of claim 1, comprises a power management chip (PM IC), wherein:
    the switched-capacitor conversion chip comprises a first-stage switched-capacitor conversion chip and a second-stage switched-capacitor conversion chip;
    an input of the first-stage switched-capacitor conversion chip is coupled to the receiving chip, an output of the first-stage switched-capacitor conversion chip is coupled to an input of the second-stage switched-capacitor conversion chip and an input of the power management chip, and an output of the second-stage switched-capacitor conversion chip and an output of the power management chip are coupled to the battery;
    the first-stage switched-capacitor conversion chip is configured to output a third DC power supply based on the first DC power supply, a voltage of the third DC power supply being lower than a voltage of the first DC power supply, and a current of the third DC power supply being greater than a current of the first DC power supply;
    the second-stage switched-capacitor conversion chip is configured to output the second DC power supply based on the third DC power supply, and charge the battery with a first current based on the second DC power supply, a voltage of the second DC power supply being lower than a voltage of the third DC power supply, and a current of the second DC power supply being greater than a current of the third DC power supply; and
    the power management chip is configured to charge the battery with a second current based on the second DC power supply, the second current being lower than the first current.

3. The receiver of claim 1, wherein the switched-capacitor conversion chip is configured to enter into the current limiting mode by at least one of:
    increasing an on-resistance of an internal switch of the switched-capacitor conversion chip;
    disconnecting an internal switch for charging a charging capacitor in the switched-capacitor conversion chip;
    connecting the charging capacitor to an output of the switched-capacitor conversion chip in parallel for discharging; and
    reducing a charging duration of the charging capacitor in the switched-capacitor conversion chip.

4. The receiver of claim 1, wherein the switched-capacitor conversion chip is configured to exit the current limiting mode in response to the path current being lower than a difference between the current threshold and a second current deviation, the second current deviation being greater than or equal to 0, and lower than the current threshold.

5. The receiver of claim 1, wherein the path current comprises at least one of:
    an input current of the switched-capacitor conversion chip, an output current of the switched-capacitor conversion chip, and a current on an internal switch in the switched-capacitor conversion chip.

6. The receiver of claim 1, wherein the switched-capacitor conversion chip is configured to adjust the current threshold according to a first control instruction from a processor of a terminal.

7. The receiver of claim 6, wherein the switched-capacitor conversion chip is configured to enter into a shoot-through state according to a second control instruction from the processor of the terminal.

8. A terminal, comprising:
    a wireless charging receiver comprising:
        a receiving coil, configured to couple an alternating magnetic field of a transmitting coil of a wireless charging transmitter, to obtain an alternating-current (AC) power supply;
        a receiving chip, having an input coupled to the receiving coil and an output coupled to an input of a switched-capacitor conversion chip, and configured to convert the AC power supply into a first direct-current (DC) power supply; and
        the switched-capacitor conversion chip, having an output coupled to a battery, and configured to output a second DC power supply based on the first DC power supply, and charge the battery based on the second DC power supply, a voltage of the second DC power supply being lower than a voltage of the first DC power supply, and a current of the second DC power supply being greater than a current of the first DC power supply; and a processor, wherein:
the switched-capacitor conversion chip is configured to detect a path current, and enter into a current limiting mode in response to the path current being greater than or equal to a sum of a current threshold and a first current deviation, the first current deviation being greater than or equal to 0, and lower than the current threshold;
the processor is configured to output a first control instruction for adjusting the current threshold according to a path current expected presently; and
the switched-capacitor conversion chip is configured to adjust the current threshold according to the first control instruction.

9. The terminal of claim 8, wherein the wireless charging receiver comprises a power management chip (PMIC), wherein:
the switched-capacitor conversion chip comprises a first-stage switched-capacitor conversion chip and a second-stage switched-capacitor conversion chip;
an input of the first-stage switched-capacitor conversion chip is coupled to the receiving chip, an output of the first-stage switched-capacitor conversion chip is coupled to an input of the second-stage switched-capacitor conversion chip and an input of the power management chip, and an output of the second-stage switched-capacitor conversion chip and an output of the power management chip are coupled to the battery;
the first-stage switched-capacitor conversion chip is configured to output a third DC power supply based on the first DC power supply, a voltage of the third DC power supply being lower than a voltage of the first DC power supply, and a current of the third DC power supply being greater than a current of the first DC power supply;
the second-stage switched-capacitor conversion chip is configured to output the second DC power supply based on the third DC power supply, and charge the battery with a first current based on the second DC power supply, a voltage of the second DC power supply being lower than a voltage of the third DC power supply, and a current of the second DC power supply being greater than a current of the third DC power supply; and
the power management chip is configured to charge the battery with a second current based on the second DC power supply, the second current being lower than the first current.

10. The terminal of claim 8, wherein the switched-capacitor conversion chip is configured to enter into the current limiting mode by at least one of:
increasing an on-resistance of an internal switch of the switched-capacitor conversion chip;
disconnecting an internal switch for charging a charging capacitor in the switched-capacitor conversion chip;
connecting the charging capacitor to an output of the switched-capacitor conversion chip in parallel for discharging; and
reducing a charging duration of the charging capacitor in the switched-capacitor conversion chip.

11. The terminal of claim 8, wherein the processor is configured to reduce an output voltage of the receiving chip of the wireless charging receiver according to an on-resistance of an internal switch of the switched-capacitor conversion chip, a conductive state of the internal switch of the switched-capacitor conversion chip, or a charging duration of a charging capacitor in the switched-capacitor conversion chip.

12. The terminal of claim 8, wherein the processor is configured to output a second control instruction for controlling the switched-capacitor conversion chip to enter into a shoot-through state in response to entering a constant-voltage charging period; and
the switched-capacitor conversion chip is configured to enter into the shoot-through state according to the second control instruction.

13. A charging system, comprising:
a wireless charging transmitter;
a battery;
a wireless charging receiver comprising:
a receiving coil, configured to couple an alternating magnetic field of a transmitting coil of a wireless charging transmitter, to obtain an alternating-current (AC) power supply;
a receiving chip, having an input coupled to the receiving coil and an output coupled to an input of a switched-capacitor conversion chip, and configured to convert the AC power supply into a first direct-current (DC) power supply; and
the switched-capacitor conversion chip, having an output coupled to the battery, and configured to output a second DC power supply based on the first DC power supply, and charge the battery based on the second DC power supply, a voltage of the second DC power supply being lower than a voltage of the first DC power supply, and a current of the second DC power supply being greater than a current of the first DC power supply; and a processor, wherein:
the switched-capacitor conversion chip is configured to detect a path current, and enter into a current limiting mode in response to the path current being greater than or equal to a sum of a current threshold and a first current deviation, the first current deviation being greater than or equal to 0, and lower than the current threshold;
the processor is configured to output a first control instruction for adjusting the current threshold according to a path current expected presently; and
the switched-capacitor conversion chip is configured to adjust the current threshold according to the first control instruction.

14. The charging system of claim 13, wherein the wireless charging receiver comprises a power management chip (PMIC), wherein:
the switched-capacitor conversion chip comprises a first-stage switched-capacitor conversion chip and a second-stage switched-capacitor conversion chip;
an input of the first-stage switched-capacitor conversion chip is coupled to the receiving chip, an output of the first-stage switched-capacitor conversion chip is coupled to an input of the second-stage switched-capacitor conversion chip and an input of the power management chip, and an output of the second-stage switched-capacitor conversion chip and an output of the power management chip are coupled to the battery;
the first-stage switched-capacitor conversion chip is configured to output a third DC power supply based on the first DC power supply, a voltage of the third DC power supply being lower than a voltage of the first DC power supply, and a current of the third DC power supply being greater than a current of the first DC power supply;

the second-stage switched-capacitor conversion chip is configured to output the second DC power supply based on the third DC power supply, and charge the battery with a first current based on the second DC power supply, a voltage of the second DC power supply being lower than a voltage of the third DC power supply, and a current of the second DC power supply being greater than a current of the third DC power supply; and the power management chip is configured to charge the battery with a second current based on the second DC power supply, the second current being lower than the first current.

15. The charging system of claim 13, wherein, the switched-capacitor conversion chip is configured to enter into the current limiting mode by at least one of:

increasing an on-resistance of an internal switch of the switched-capacitor conversion chip;

disconnecting an internal switch for charging a charging capacitor in the switched-capacitor conversion chip;

connecting the charging capacitor to an output of the switched-capacitor conversion chip in parallel for discharging; and reducing a charging duration of the charging capacitor in the switched-capacitor conversion chip, the processor is configured to reduce an output voltage of the receiving chip of the wireless charging receiver according to an on-resistance of an internal switch of the switched-capacitor conversion chip, a conductive state of the internal switch of the switched-capacitor conversion chip, or a charging duration of a charging capacitor in the switched-capacitor conversion chip.

16. The charging system of claim 13, wherein the processor is configured to output a second control instruction for controlling the switched-capacitor conversion chip to enter into a shoot-through state in response to entering a constant-voltage charging period; and the switched-capacitor conversion chip is configured to enter into the shoot-through state according to the second control instruction.

17. The charging system of claim 13, wherein the wireless charging transmitter comprises:

a charger;

a transmitting chip, having an input coupled to the charger, and an output coupled to a transmitting coil, and configured to communicate with the charger based on a control protocol, control the charger to output a voltage of DC power supply, and convert the DC power supply into an alternating current (AC) power supply; and the transmitting coil, configured to convert the AC power supply into an alternating magnetic field.

\* \* \* \* \*